Nov. 8, 1932.　　　　G. A. MACHIN　　　　1,886,565

HUMIDIFIER FOR EXPLOSIVE ENGINES

Filed May 21, 1930

George A. Machin, Inventor

By Horace Chandler

Attorney

Patented Nov. 8, 1932

1,886,565

UNITED STATES PATENT OFFICE

GEORGE A. MACHIN, OF SACRAMENTO, CALIFORNIA

HUMIDIFIER FOR EXPLOSIVE ENGINES

Application filed May 21, 1930. Serial No. 454,404.

This invention relates to new and useful improvements in attachments for engines, and particularly to attachments for gas engines used in connection with automobiles.

The principal object of the invention is to provide a novel and improved device, for attachment to an automobile engine, by means of which steam may be supplied to the vaporized gasoline, in proper quantity, prior to the entrance of such gasoline into the intake manifold of the engine.

Another object is to provide a device of this character by means of which the steam is supplied directly to the carburetor.

Other objects and advantages will be apparent from the following description, when taken in connection with the accompanying drawing.

Figures 1, 2:
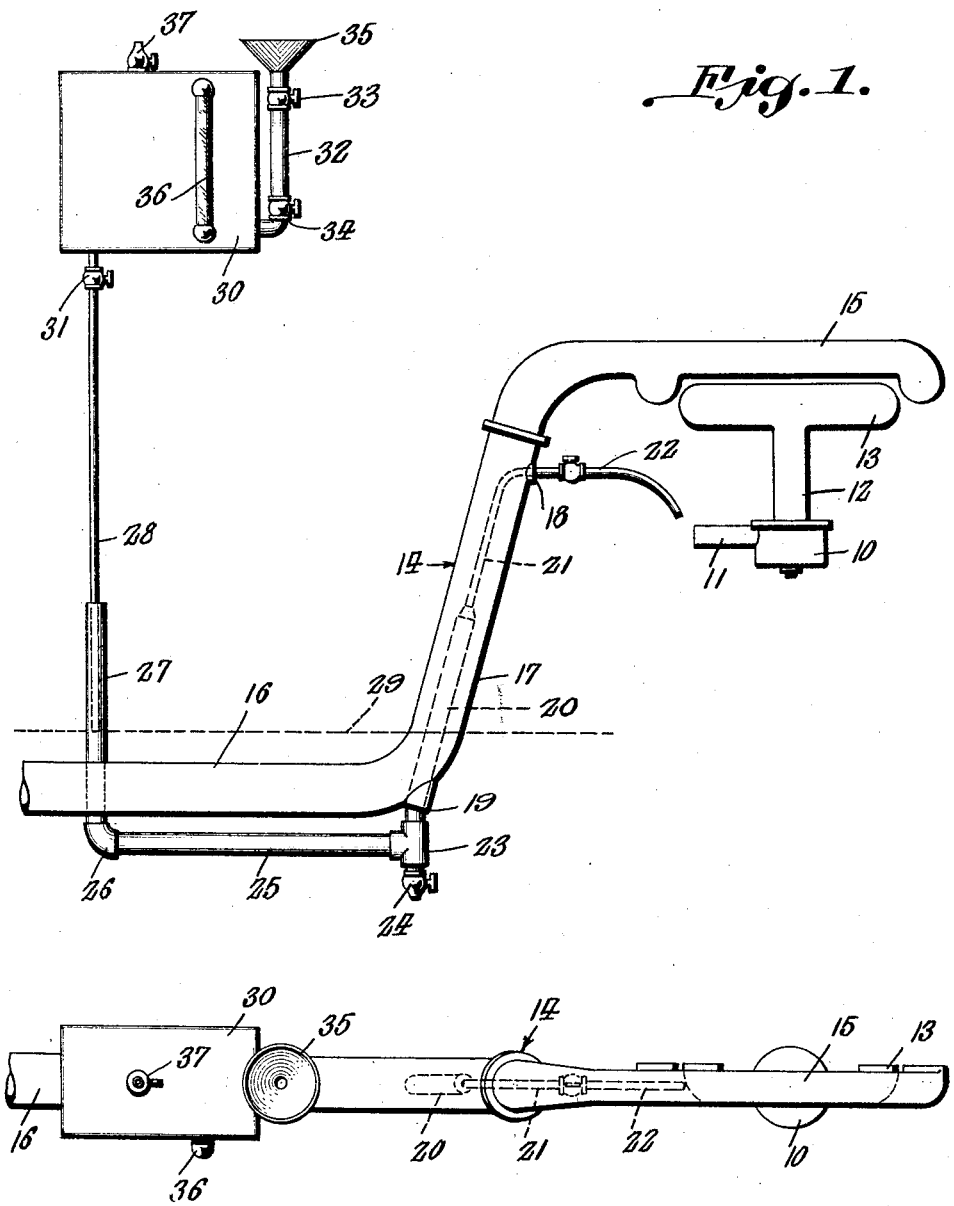
Figure 1 is an elevation of the invention associated with the manifolds and carburetor of an engine.
Figure 2 is a top plan view of the same.

Referring particularly to the accompanying drawing, 10 represents a carburetor having the laterally extending air-intake spout 11, and connected to the upper side of said carburetor is the lower end of the vertical leg 12, of the intake manifold 13, of the engine. Arranged near the intake manifold is the exhaust manifold, indicated as a whole by the numeral 14, and comprising the upper and lower horizontal portions 15 and 16, connected by the downwardly and rearwardly inclined portion 17. Formed through one side of the inclined portion 17, of the exhaust manifold, adjacent its upper end, is an opening 18, and in the lower side of the junction between the inclined portion and the lower horizontal portion 16, there is formed a similar opening 19. Disposed longitudinally within the inclined portion 17 is a pipe 20, the upper portion of which is reduced in diameter, as shown at 21, and is disposed through the opening 18, where it is provided with a small faucet 22, the mouth of which lies in position to discharge steam at the mouth of the spout 11, of the carburetor, which carburetor draws such steam thereinto, upon the suction stroke of the pistons of the engine. To the lower end of the pipe 20, exteriorly of the manifold, there is connected a T 23, a drain cock 24 being connected to one of the branches of the T, while one end of a horizontal pipe 25 is connected to the remaining branch, such pipe 25 having an L-coupling 26 on its other end receiving the lower end of a vertical pipe 27. It will be noted that the pipes 20, 25, and 27 are of the same diameter.

Disposed within the upper portion of the pipe 27 is the lower end of a pipe 28, of smaller diameter, and terminating at a point which governs the water level in the pipe 27, and pipe 20, as indicated by the horizontal dotted line 29. Suitably mounted above the lower horizontal portion of the exhaust manifold, is a water tank 30, to the lower side of which is connected the upper end of the before-mentioned pipe 28, said pipe having a cut-off valve 31 therein. Extending outwardly and upwardly, from the lower portion of one side of the tank, is a pipe 32, having the upper and lower valves 33 and 34 therein, and having a funnel 35 on its upper end, which permits filling the tank with water, when said valves are open. The side of the tank is provided with a gauge glass 36, while the top of the tank is provided with a valved member 37, adapted to be opened, while filling the tank.

In the operation of the device, the valves 33, 34, and 37 are closed, while the valve 31 is opened. The valve 24 is closed, while the faucet is opened. Water will flow down the pipe 28, through the pipes 27, 25, and 20, until the water level in the pipes 20 and 27 stand even with the lower end of the pipe 28. The heat from the exhaust gases passing through the manifold 14, heats the pipe 20, so that steam is generated, which flows out through the faucet 22, into the path of the air being sucked in through the spout 11, of the carburetor, with the result that a portion of such steam is sucked in with the air, and is mixed with the vaporized gasoline, as the latter is drawn upwardly into the intake manifold.

What is claimed is:

A humidifier for an internal combustion engine comprising a source of water supply, a conduit in the form of a U-shaped loop and having one arm adjacent the said source and the other arm disposed longitudinally within a vertical portion of the exhaust manifold of such engine to provide for heating and vaporizing of the water in said arm of the conduit, a valved discharge on the outer end of the conduit for delivering water vapor to the air intake of the carburetor of such engine, and means for governing the level of the water in that portion of the conduit within the exhaust manifold, consisting of a pipe leading in the adjacent arm of said conduit.

In testimony whereof, I affix my signature.

GEO. A. MACHIN.